United States Patent
Bhagavatula et al.

(10) Patent No.: US 7,099,535 B2
(45) Date of Patent: Aug. 29, 2006

(54) SMALL MODE-FIELD FIBER LENS

(75) Inventors: Venkata A. Bhagavatula, Big Flats, NY (US); John Himmelreich, Horseheads, NY (US); Nagaraja Shashidhar, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 165 days.

(21) Appl. No.: 10/699,450

(22) Filed: Oct. 31, 2003

(65) Prior Publication Data

US 2004/0126059 A1    Jul. 1, 2004

Related U.S. Application Data

(60) Provisional application No. 60/437,328, filed on Dec. 31, 2002.

(51) Int. Cl.
*G02B 6/32* (2006.01)
*G02B 6/18* (2006.01)

(52) U.S. Cl. ............................ 385/33; 385/124; 385/34

(58) Field of Classification Search ............... 385/31, 385/33–35, 50, 74, 124
See application file for complete search history.

(56) References Cited

U.S. PATENT DOCUMENTS

| | | | |
|---|---|---|---|
| 3,832,028 A | 8/1974 | Kapron | 350/96 |
| 4,130,343 A | 12/1978 | Miller et al. | 350/96.15 |
| 4,186,999 A | 2/1980 | Harwood et al. | 350/96.21 |
| 4,281,891 A | 8/1981 | Shinohara et al. | 350/96.18 |
| 4,380,365 A | 4/1983 | Gross | 350/96.18 |
| 4,456,330 A | 6/1984 | Bludaii | 350/96.18 |
| 4,496,211 A | 1/1985 | Daniel | 350/96.18 |
| 4,542,987 A | 9/1985 | Hirschfeld | 356/44 |
| 4,737,006 A | 4/1988 | Warbrick | 350/96.18 |
| 4,743,283 A | 5/1988 | Borsuk | 65/2 |
| 4,756,590 A | 7/1988 | Forrest et al. | 350/96.15 |
| 4,784,466 A | 11/1988 | Khoe et al. | 350/96.33 |
| 4,785,824 A | 11/1988 | Wickerson et al. | 128/736 |
| 4,865,417 A | 9/1989 | Yamamoto Naohiro et al. | 350/96.3 |
| 4,896,942 A | 1/1990 | Onstott et al. | 350/96.33 |
| 5,008,545 A | 4/1991 | Anderson et al. | 250/358.1 |
| 5,039,193 A | 8/1991 | Snow et al. | 385/25 |
| 5,163,133 A | 11/1992 | Melman | 385/31 |
| 5,293,438 A | 3/1994 | Konno et al. | 385/35 |
| 5,351,323 A | 9/1994 | Miller et al. | 385/28 |
| 5,377,287 A | 12/1994 | Lee et al. | 385/35 |
| 5,446,816 A | 8/1995 | Shiraishi et al. | 385/33 |
| 5,455,879 A | 10/1995 | Modavis et al. | 385/33 |
| 5,551,968 A | 9/1996 | Pan | 65/387 |

(Continued)

FOREIGN PATENT DOCUMENTS

DE    3134508    3/1983

(Continued)

OTHER PUBLICATIONS

Thual et al., Appropriate micro-lens to improve coupling between laser diodes and singlemode fibres, Oct. 16, 2003, Electronics Letters, vol. 39, No. 21.*

(Continued)

*Primary Examiner*—John D. Lee
*Assistant Examiner*—Omar Rojas
(74) *Attorney, Agent, or Firm*—Timothy M. Schaeberle

(57) ABSTRACT

A fiber lens includes a graded-index lens, a single-mode fiber disposed at a first end of the graded-index lens, and a refractive lens having a hyperbolic or near-hyperbolic shape disposed at a second end of the graded-index lens to focus a beam from the single-mode fiber to a diffraction-limited spot.

16 Claims, 8 Drawing Sheets

U.S. PATENT DOCUMENTS

| | | |
|---|---|---|
| 5,606,181 A | 2/1997 | Sakuma et al. ............... 257/88 |
| 5,638,471 A | 6/1997 | Semo et al. ................... 385/33 |
| 5,647,041 A | 7/1997 | Presby ......................... 385/43 |
| 5,699,464 A | 12/1997 | Marcuse et al. .............. 385/33 |
| 5,719,973 A | 2/1998 | Monroe et al. ............... 385/34 |
| 5,751,871 A | 5/1998 | Krivoshlykov et al. ....... 385/33 |
| 5,754,717 A | 5/1998 | Esch ............................ 385/31 |
| 5,774,607 A | 6/1998 | Shiraishi et al. .............. 385/33 |
| 5,908,562 A | 6/1999 | Ohtsu et al. .................. 216/11 |
| 5,937,122 A | 8/1999 | Ohki et al. .................... 385/78 |
| 5,946,441 A | 8/1999 | Esch ............................ 385/139 |
| 5,953,162 A | 9/1999 | Blankenbecler ............. 359/653 |
| 6,075,650 A | 6/2000 | Morris et al. ................ 359/641 |
| 6,081,637 A | 6/2000 | Rekow ......................... 385/31 |
| 6,081,638 A | 6/2000 | Zhou ............................ 385/31 |
| 6,094,517 A | 7/2000 | Yuuki .......................... 385/43 |
| 6,123,440 A | 9/2000 | Albou .......................... 362/516 |
| 6,130,972 A | 10/2000 | Shiraishi et al. .............. 385/33 |
| 6,205,274 B1 | 3/2001 | Zhou ............................ 385/38 |
| 6,282,347 B1 | 8/2001 | Ono et al. .................... 385/74 |
| 6,293,688 B1 | 9/2001 | Deacon ........................ 362/556 |
| 6,146,234 A1 | 7/2002 | Wach et al. .................. 385/70 |
| 6,768,837 B1* | 7/2004 | Thual et al. .................. 385/33 |

FOREIGN PATENT DOCUMENTS

| | | |
|---|---|---|
| EP | 0155379 | 9/1985 |
| EP | 0278212 | 9/1993 |
| EP | 0558230 | 9/1993 |
| EP | 0802433 | 10/1997 |
| EP | 0872747 | 10/1998 |
| GB | 2110835 | 6/1983 |
| JP | 2000304965 | 2/2000 |
| WO | WO00/34810 | 6/2000 |
| WO | WO01/71403 | 9/2001 |
| WO | 03/076994 | 9/2003 |
| WO | WO03/076994 | 9/2003 |

OTHER PUBLICATIONS

Bludau et al.; "Low-Loss Laser-to-Fiber Coupling with Negligible Optical Feedback"; Journal of Lighwave Technology; vol. 3, No. 2: Apr. 1985: pp. 294-302.

Shute et al.; "A Study of the Polarization Properties of a Rectangle Polarization-Maintaining Fiber"; Journal of Lightwave Technoloogy; vol. 7, No. 12; Dec. 1989; pp. 2013-2017.

Emkey et al.; "Analysis and Evaluation of Graded-Index Fiber-Lenses"; Journal of Lightwave Technology; vol. 5, No. 9; Sep. 1987; pp. 1156-1164.

Edwards et al.; "Ideal Microlenses for Laser to Fiber Coupling"; Journal of Lightwave Technology; vol. 11, No. 2; Feb. 1993; pp. 252-257.

Yoda et al.; "A New Scheme of a Lensed Fiber Employing a Wedge-Shaped Graded-Index Fiber Tip for the Coupling Between High-Power Laser Diodes and Single-Mode Fibers"; Journal of Lightwave Technology; vol. 19, No. 12; Dec. 2001; pp. 1910-1917.

* cited by examiner

SMALL MODE-FIELD FIBER LENS

CROSS-REFERENCE TO RELATED APPLICATIONS

This application claims the benefit of U.S. Provisional Application Ser. No. 60/437,328, filed Dec. 31, 2002, entitled "Small Mode-Field Fiber Lens."

BACKGROUND OF THE INVENTION

The invention relates generally to optical devices for coupling optical signals between optical components. More specifically, the invention relates to a fiber lens for coupling signals between optical components.

Various approaches are used in optical communications to couple optical signals between optical components, such as optical fibers, laser diodes, and semiconductor optical amplifiers. One approach involves the use of a fiber lens, which is a monolithic device having a lens disposed at one end of a pigtail fiber. Light can enter or exit the fiber lens through either the lens or the pigtail fiber. The fiber lens can focus light from the pigtail fiber into a spot having the required size and intensity at a selected working distance. However, prior art has limitations on how small the spot size can be to achieve the required intensity distribution and limitations on the working distance achievable while controlling the spot size and intensity distribution. For some applications, it is desirable to obtain mode field diameters as small as 2.5 to 3.0 µm while maintaining Gaussian intensity distribution at working distances larger than 5 µm. Examples of such applications include coupling of optical signals from a semiconductor optical amplifier to an optical fiber, from a high-index semiconductor or dielectric waveguide to an optical fiber, etc.

From the foregoing, there is desired a fiber lens that can produce a focused spot with a small mode field diameter and the required intensity distribution for a broad range of working distances.

SUMMARY OF THE INVENTION

In one aspect, the invention relates to a fiber lens which comprises a graded-index lens, a single-mode fiber disposed at a first end of the graded-index lens, and a refractive lens having a hyperbolic or near-hyperbolic shape disposed at a second end of the graded-index lens to focus a beam from the single-mode fiber to a diffraction-limited spot.

In another aspect, the invention relates to a fiber lens which comprises a single-mode fiber and a lens disposed at an end of the single-mode fiber, wherein a mode field diameter at a beam waist of a beam emerging from a tip of the lens is less than 10 µm and a ratio of distance from the tip of the lens to the beam waist to the mode field diameter at the beam waist is greater than 5.

In yet another aspect, the invention relates to a method of making a fiber lens which comprises splicing a single-mode fiber to a graded-index fiber, cutting the graded-index fiber to a desired length, and rounding a tip of the graded-index fiber into a hyperbolic or near-hyperbolic shape.

In another aspect, the invention relates to a method of making a fiber lens which comprises splicing a single-mode fiber to a graded-index fiber, cutting the graded-index fiber to a desired length, splicing a coreless fiber to the graded-index fiber, cutting the coreless fiber to a desired length, and rounding a tip of the coreless fiber into a hyperbolic or near-hyperbolic shape.

These and other features and advantages of the invention will be discussed in more detail in the following detailed description of the invention and in conjunction with the following figures.

BRIEF DESCRIPTION OF THE DRAWINGS

The invention is illustrated by way of example, and not by way of limitation, in the figures accompanying the drawings, and in which like reference numerals refer to similar elements, and in which.

DETAILED DESCRIPTION OF THE PREFERRED EMBODIMENTS

The invention will now be described in detail with reference to a few preferred embodiments, as illustrated in the accompanying drawings. In the following description, numerous specific details are set forth in order to provide a thorough understanding of the invention. It will be apparent, however, to one of ordinary skill in the art that the invention may be practiced without some or all of these specific details. In other instances, well-known process steps and/or features have not been described in detail to avoid unnecessarily obscuring the invention. The features and advantages of the invention may be better understood with reference to the drawings and the following discussions.

Embodiments of the invention provide a fiber lens that can focus light from an optical fiber into a spot having the required size and intensity distribution at a distance required by the application. The fiber lens uses a combination of a refractive lens and a graded-index (GRIN) lens to produce a focused beam. In one embodiment, the refractive lens has a hyperbolic shape for focusing a collimated beam into a diffraction-limited spot. In another embodiment, the refractive lens has a near-hyperbolic shape for focusing a non-collimated beam into a diffraction-limited spot. With control of the multimode parameters of the GRIN lens and the shape of the refractive lens, small mode field diameters (MFDs), e.g., in a range from 2 to 5 µm, with reasonably Gaussian intensity distributions, have been achieved. Further, long working distances as large as 25 to 40 µm have been achieved at 1550 nm operating wavelength while maintaining the small MFDs and Gaussian intensity distributions.

Figure 1A:
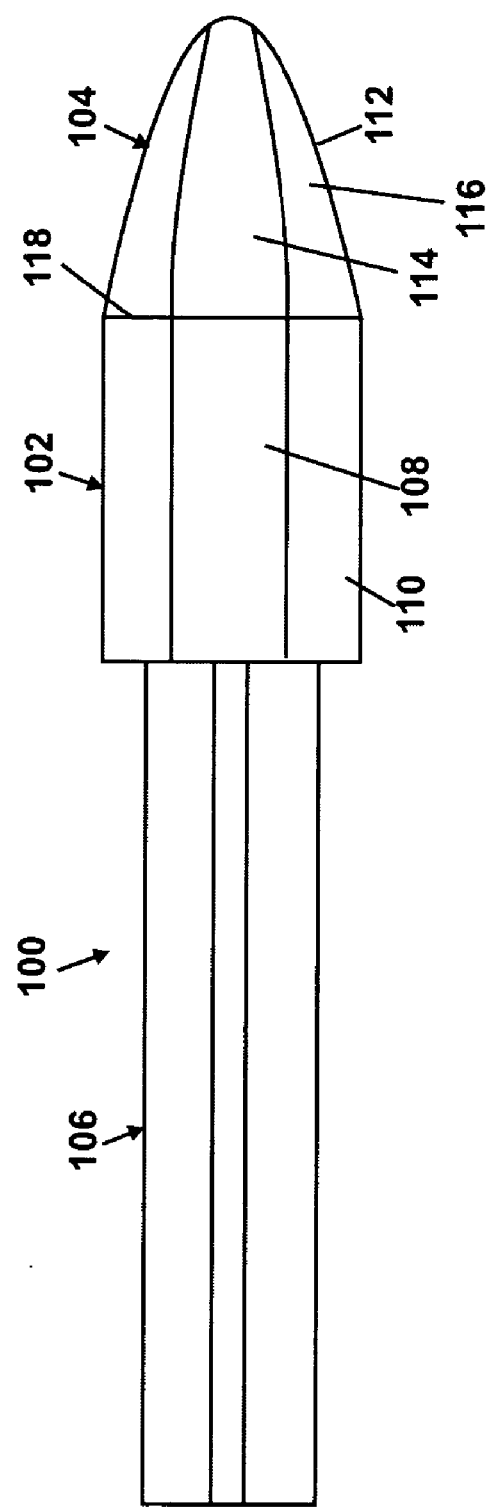
FIG. 1A is a schematic of a fiber lens according to an embodiment of the invention.

FIG. 1A shows a fiber lens 100 according to an embodiment of the invention. The fiber lens 100 includes a graded-index (GRIN) lens 102, a refractive lens 104 disposed at one end of the GRIN lens 102, and a single-mode pigtail fiber 106 disposed at another end of the GRIN-fiber lens 102. The GRIN lens 102 has a core 108, which may or may not be bounded by a cladding 110. The core 108 of the GRIN lens 102 preferably has a refractive index profile that increases radially toward the optical axis of the fiber lens 100, such as a square law or parabolic profile. In one embodiment, the refractive lens 104 is a hyperbolic lens having a hyperbolic surface 112. The hyperbolic lens 104 has a core 114, which may or may not be bounded by a cladding 116. Ideally, the core 114 should have a uniform refractive index, but it may be easier to form the refractive lens 104 by polishing an end of the GRIN lens 102 into the hyperbolic surface 112, in which case the core 114 would have a refractive index profile that increases radially toward the optical axis of the fiber lens 100.

The profile of the hyperbolic lens 104 is given by:

$$\frac{u^2}{a^2} - \frac{v^2}{b^2} = 1 \qquad (1a)$$

Figure 1B:
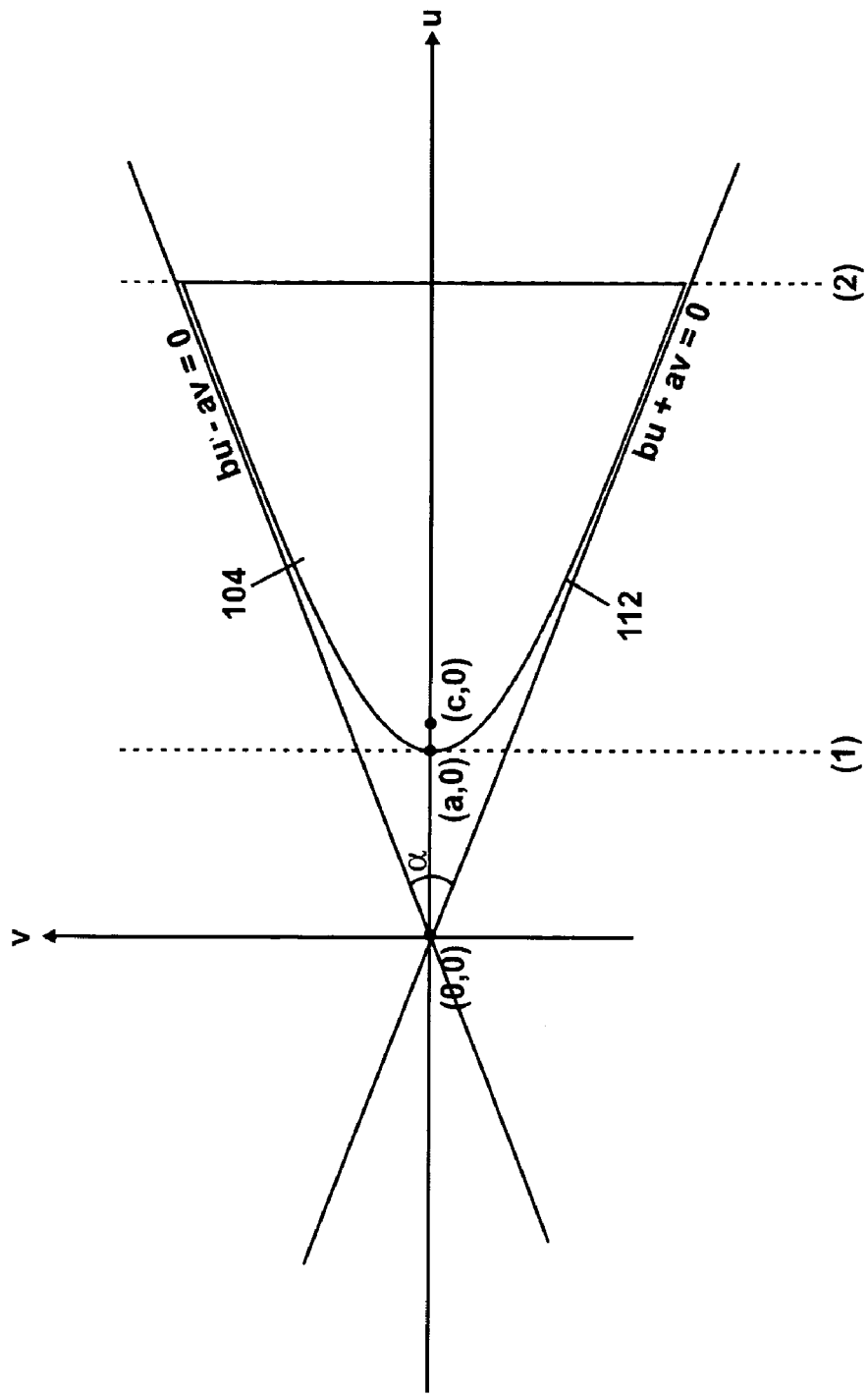
FIG. 1B is a geometrical representation of a hyperbolic lens.

FIG. 1B is a graphical representation of the expression above. In this representation, the hyperbolic lens 104 is a branch of a hyperbola on a u-v coordinate system, and the vertex of the hyperbola branch lies on the u-axis at (a,0). The focus of the hyperbola branch is at (c,0), where c is given by:

$$c = \sqrt{a^2 + b^2} \qquad (1b)$$

The hyperbola branch is contained within two asymptotes, which are represented by:

$$bu \pm av = 0 \qquad (1c)$$

The slopes of the asymptotes are +b/a and −b/a. The asymptotes intersect at the origin (0,0) to form a wedge having an apex angle, α, which is given by:

$$\alpha = 2 \tan^{-1}(b/a) \qquad (1d)$$

According to Edwards et al., for an ideal hyperbolic profile that exactly transforms an incident spherical wave into a plane wave, the terms a and b in equations (1a) through (1d) above are given by the following expressions:

$$a^2 = \left(\frac{n_2}{n_1 + n_2}\right)^2 r_2^2 \qquad (2a)$$

$$b^2 = \left(\frac{n_1 - n_2}{n_1 + n_2}\right) r_2^2 \qquad (2b)$$

where $n_1$ is the refractive index of the core of the hyperbolic lens, $n_2$ is the refractive index of the medium surrounding the core of the hyperbolic lens, and $r_2$ is the radius of curvature at the tip of the hyperbolic lens. (Edwards, Christopher A., Presby, Herman M., and Dragone, Corrado. "Ideal Microlenses for Laser to Fiber Coupling." Journal of Lightwave Technology, Vol 11, No. 2, (1993): 252.) With this hyperbolic profile, the mode field radii at planes (1) and (2), shown in FIG. 1B, are equal, and the radius of curvature at plane (2) is infinity, i.e., the beam wavefront at plane (2) is planar.

Figure 1C:
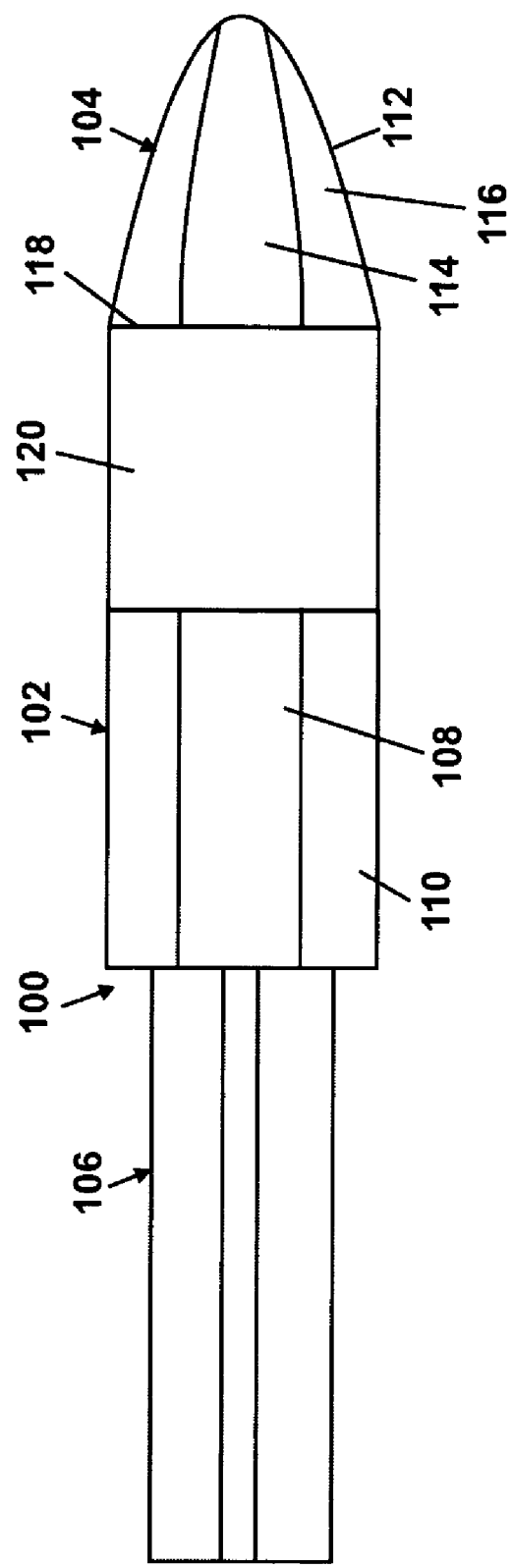
FIG. 1C shows a fiber lens having a coreless spacer rod interposed between a GRIN lens and a refractive lens.

Returning to FIG. 1A, the pigtail fiber 106 could be any standard single-mode fiber, such as Corning SMF-28® fiber, or a specialty single-mode fiber, such as a polarization-maintaining (PM) fiber. The pigtail fiber 106 may be circularly symmetrical when viewed from the end or may have other shape, e.g., square or elliptical. The GRIN lens 102 is preferably affixed to the pigtail fiber 106. For reliability and long-term stability, the GRIN lens 102 could be affixed to the pigtail fiber 106 by fusion splicing. The hyperbolic lens 104 could be formed directly on the GRIN lens 102 or formed on a coreless spacer rod attached to the GRIN lens 102. As shown in FIG. 1C, the hyperbolic lens 104 could also be attached to a coreless spacer rod 120, which is attached to the GRIN lens 102. Since final dimensions of the refractive lenses and spacer rods are generally quite small, in the preferred approach, longer lengths of the grin fiber or spacer rod are attached to the pigtail first and cut or cleaved to required length before the refractive lens is shaped on the end (A coreless spacer rod could also be interposed between the GRIN lens 102 and the pigtail fiber 106.) The hyperbolic lens 104 can be formed by shaping a length of fiber into a cone/wedge having an apex angle (α in FIG. 1B). For example, the fiber could be shaped into a cone/wedge using a taper-cutting process (for symmetry) or laser micromachining with polishing. A curvature can then be formed at the tip of the resulting cone/wedge to give the desired hyperbolic profile. Although not shown in the drawings, the GRIN lens and/or the single-mode pigtail fiber could be tapered. The overall diameter of the pigtail fiber could be smaller than or substantially the same as the overall diameter of the GRIN lens.

The GRIN lens 102 and the hyperbolic lens 104 produce a focused beam having a small mode field diameter (MFD), good wavefront characteristics, and long working distances. In one embodiment, the following attributes are desirable: mode field diameter (MFD) at the beam waist less than 10 µm, preferably in a range from 2 to 5 µm, with reasonably Gaussian intensity distributions, working distances larger than 5 µm, preferably in a range from 20 to 60 µm, ratio of distance from tip of the lens to the beam waist to the MFD at the beam waist greater than 5, and lens-to-lens coupling efficiency greater than 65% for operating wavelengths in a range from 250 to 2,000 nm. Both the hyperbolic lens 104 and the GRIN lens 102 are important to achieving the small MFDs and long working distances. For instance, if the GRIN lens 102 is not used, the spot size at the tip of the hyperbolic lens 104 would be limited to the MFD of the single-mode pigtail fiber 106, which would limit the working distance achievable to small values. For example, most practical single-mode fibers have a MFD in a range of 10–12 µm at 1550 nm operating wavelength. For a single-mode fiber having 10-µm MFD and 38-µm divergence angle, which are needed for a focused MFD of 3 µm, the longest working distance would be limited to about 14 µm if only a hyperbolic lens is used.

Figure 2A:
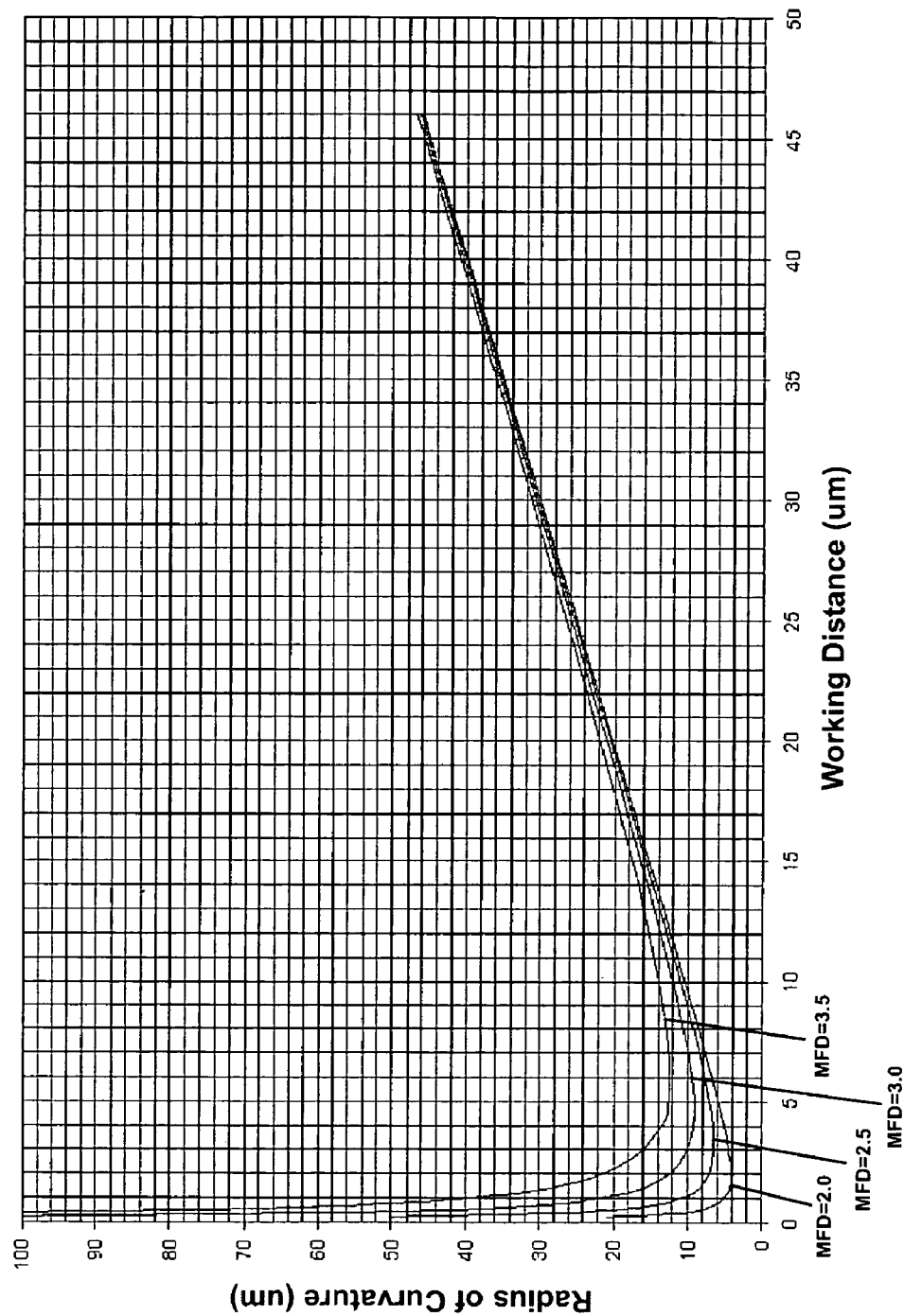
FIG. 2A is a plot of radius of curvature at the tip of a hyperbolic lens as a function of working distance for a case where a hyperbolic lens is disposed at an end of a single-mode pigtail fiber.
Figure 2B:
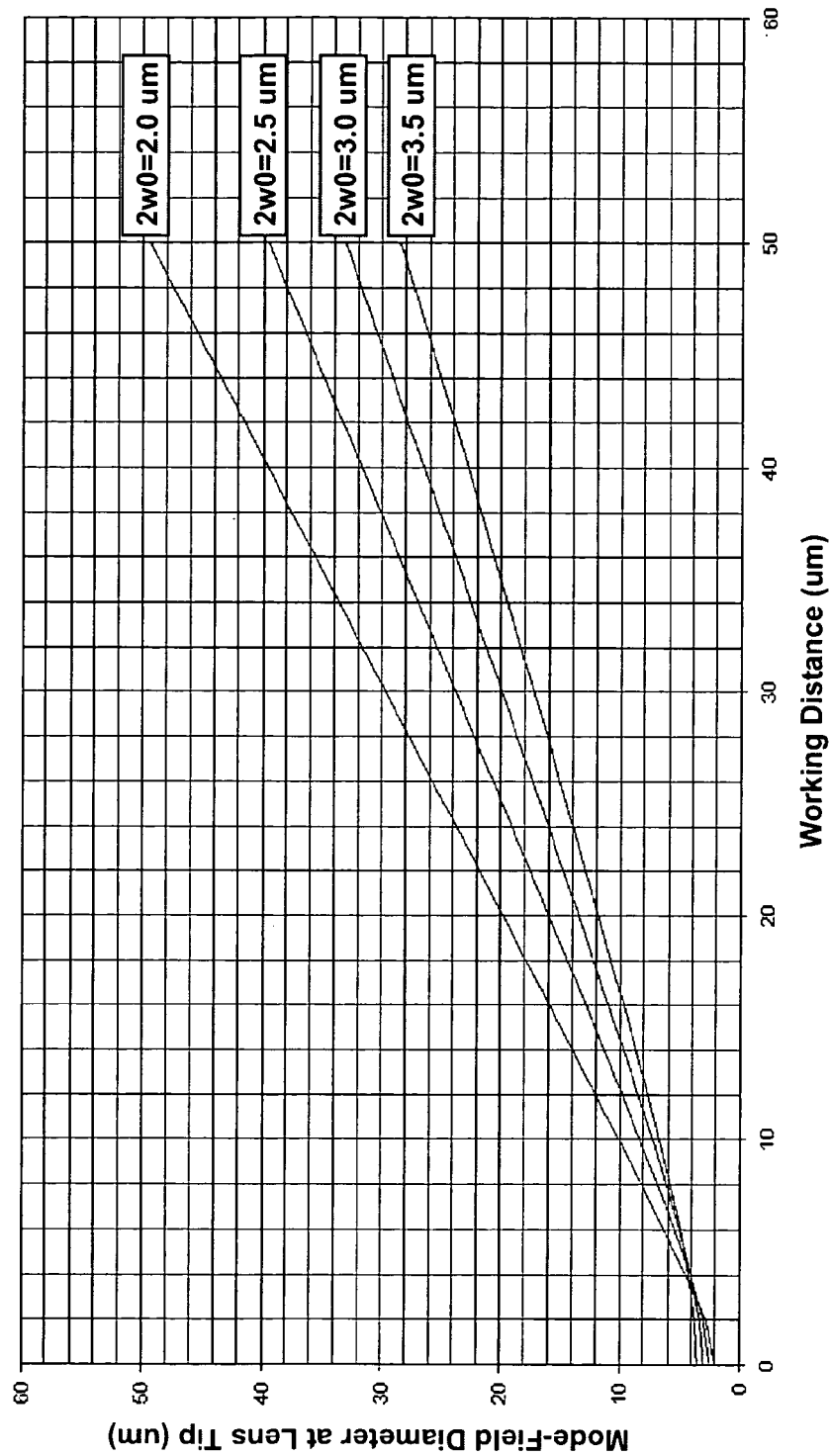
FIG. 2B shows variation of MFD at the tip of the hyperbolic lens as a function of working distance for the example shown in FIG. 2A.

To further illustrate the importance of using both the hyperbolic lens 104 and the GRIN lens 102, consider FIG. 2A which shows radius of curvature at the tip of a hyperbolic lens as a function of working distance for a fiber lens having a hyperbolic lens disposed at an end of a single-mode pigtail fiber without intervention of a GRIN lens. The figure shows that this fiber lens has good wavefront characteristics. FIG. 2B shows variation of MFD at the tip of the hyperbolic lens as a function of working distance for the example shown in FIG. 2A. This figure shows that for focused MFDs ranging from 2.0–3.5 µm, the MFD at the tip of the hyperbolic lens must be greater than 10 µm to achieve working distances greater than 20 µm. Unless a GRIN lens is interposed between the hyperbolic lens and the single-mode pigtail fiber, working distances much greater than 20 µm would not be achievable using most practical single-mode fibers because the MFD at the tip of the hyperbolic lens would be limited to the MFD of the single-mode pigtail fiber.

Figure 3:
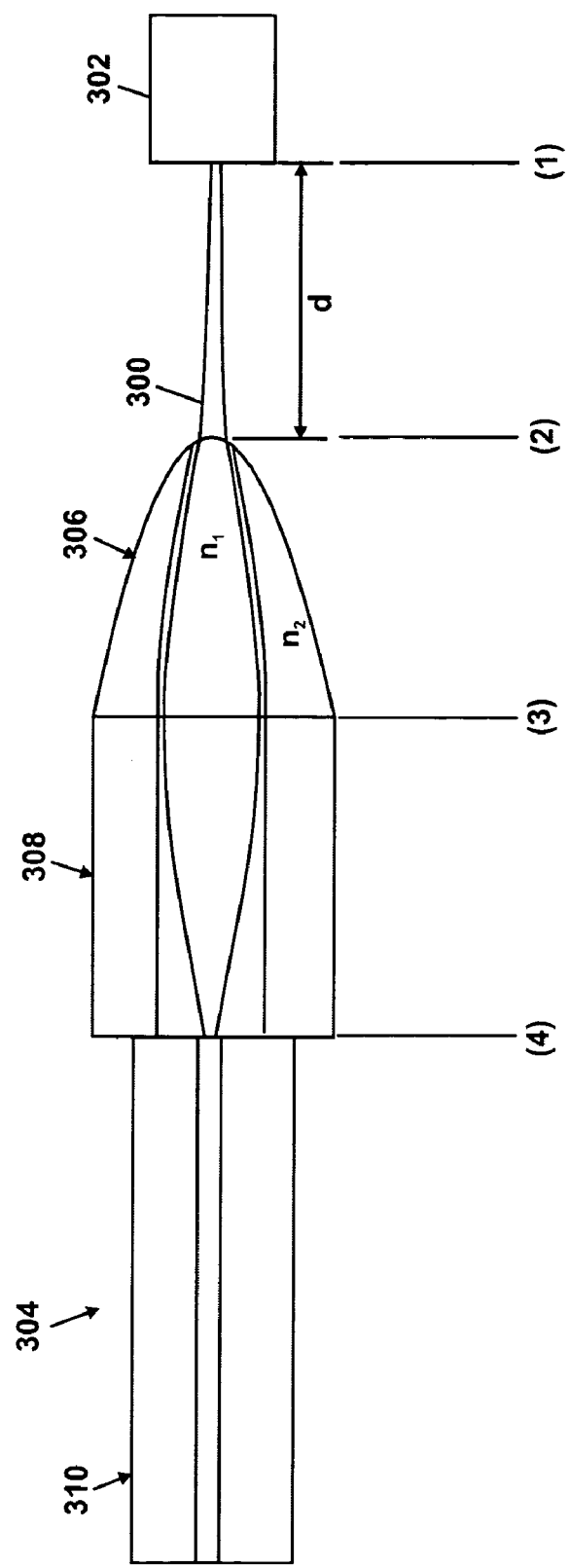
FIG. 3 is a schematic of beam propagation through a fiber lens of the present invention.

FIG. 3 shows a beam 300 propagating through planes (1), (2), (3), and (4). Plane (1) contains an end face of an optical device 302. Plane (2) coincides with the tip of a fiber lens 304. Plane (3) coincides with an interface between a hyperbolic lens 306 and a GRIN lens 308. Plane (4) contains an end face of a single-mode pigtail fiber 310. Assume that the optical device 302 has MFD equal to $2w_0$ and is positioned a distance d from the tip of the fiber lens 304. In this case, it is desirable to design the fiber lens 304 such that the focused spot size of the fiber lens 304 is as close as possible to $2w_0$ at the distance d from the tip of the fiber lens 304 at an operating wavelength 8. The properties of the beam at the end of the GRIN lens 308 and the properties of the hyperbolic lens 306 determine the spot size characteristics of the focused beam. In one embodiment, a process for designing the fiber lens 304 includes (1) calculating the radius of curvature and mode field needed at the tip of the fiber lens 304 to produce the focused spot size, (2) determining the profile of the hyperbolic lens 306 using the calculated radius of curvature, and (3) determining the parameters of the GRIN lens 308 using the calculated mode field and the mode field of the pigtail fiber 310. The following is a discussion of one possible way of implementing this process.

For step (1), the mode field radius ($w_2$) and the radius of curvature ($r_2$) at plane (2), i.e., at the tip of the fiber lens 304, may be determined using well-known formula for the propagation of Gaussian beams. For example, Edwards et al., supra, give the following expressions for $w_2$ and $r_2$:

$$w_2 = w_0 \sqrt{1 + \left(\frac{\lambda d}{\pi w_0^2}\right)^2} \tag{2a}$$

$$r_2 = \left(\frac{\pi}{\lambda}\right)^2 \frac{(w_0 w_2)^2}{d} \tag{2b}$$

For step (2), the radius of curvature ($r_2$) obtained from equations (2a) and (2b) together with equations (1a)–(1d) can be used to determine the profile of the hyperbolic lens 306.

For step (3), the GRIN lens 308 transforms a beam at plane (3), with mode field radius $w_3$ and radius of curvature $r_3$, to a beam at plane (4), with mode field radius $w_4$ and radius of curvature $r_4$. For optimum design, $w_4$ needs to be as close as possible to the mode field radius $w_p$ of the single-mode pigtail fiber 310. One approach to achieving this optimum design would be to select a specialty single-mode pigtail fiber such that $w_p$ equal to $w_4$ for a readily-available GRIN lens 308. Alternately, the parameters of the GRIN lens 308 could be chosen such that $w_4$ is as close as possible to a specific value of $w_p$. In this case, standard single-mode fibers, such as Corning SMF-28® fiber, can be used as pigtail fibers. The GRIN lens parameters include the core diameter, outside (or cladding) diameter, index profile, relative index difference between the core and cladding, and the length of the GRIN lens. In one embodiment, the core diameter of the GRIN lens is in a range from about 50 to 500 µm with outside diameters in a range from about 60 to 1000 µm. The relative index difference values are preferably in a range from about 0.5 to 3% in high silica compositions compatible with splicing to fibers used in optical communication systems.

For the hyperbolic lens case where $r_3 = \infty$, i.e., beam at plane (3) is planar wavefront, and $w_3 = w_2$, the length of the GRIN lens 308 simplifies to a quarter pitch. In this simple case, the mode field radii $w_3$ and $w_4$ are related to the GRIN lens parameters by the following equation:

$$w_3 \cdot w_4 = \frac{\lambda}{\pi n g} \tag{3a}$$

where $$g = \frac{(2\Delta)^{1/2}}{a} \tag{3b}$$

where g is a focusing parameter, a is the radius of the core of the GRIN lens, and $\Delta$ is the relative index difference between the core and cladding of the GRIN lens. The formula for quarter pitch (L/4) is given by:

$$\frac{L}{4} = \frac{\pi \cdot a}{2 \cdot ((2 \cdot \Delta)^{1/2})} \tag{3c}$$

where $$\Delta = (n_1^2 - n_2^2)/(2 \cdot n_1^2) \tag{3d}$$

where L is pitch, $n_1$ is the refractive index of the core of the GRIN lens, and $n_2$ is the refractive index of the cladding of the GRIN lens.

For a non-quarter pitch GRIN lens, the Gaussian beam transformation can be calculated using the ABCD matrix procedures developed by Emkey et al. (Emkey, William L. and Jack, Curtis A., "Analysis and Evaluation of Graded-Index Fiber Lenses." Journal of Lightwave Technology, Vol. LT-5, No. 9, (1987): 1156–1164.) This approach uses a complex beam parameter "q," which is defined as:

$$\frac{1}{q(z)} = \frac{1}{r(z)} - i \frac{\lambda}{\pi w^2(z) n} \tag{4a}$$

where r is the radius of curvature of a Gaussian beam, w is the Gaussian mode field radius, $\lambda$ is the free-space wavelength, and n is refractive index. The transformation of q(z) from plane (4), containing the end face of the single-mode pigtail fiber 310, to plane (1), containing the final beam waist of the fiber lens 304, is given by:

$$q_1 = \frac{A q_4 + B}{C q_4 + D} \tag{4b}$$

where $q_1$ and $q_4$ are the complex beam parameters at the planes (1) and (4), respectively.

The terms A, B, C, D are elements of the ray matrix relating the ray parameters of plane (4) to plane (1) and are obtained from the following expression:

$$\begin{bmatrix} A & B \\ C & D \end{bmatrix} = M_1 M_2 M_3 M_4 \qquad (5a)$$

where $M_1$ is the transformation of the ray parameters between plane (1) and plane (2) and is expressed as follows:

$$M_1 = \begin{bmatrix} 1 & z \\ 0 & 1 \end{bmatrix} \qquad (5b)$$

where z is the final beam waist location relative to the tip of the hyperbolic lens. $M_2$ is the transformation of the ray parameters in the hyperbolic lens and is expressed as follows:

$$M_2 = \begin{bmatrix} 1 & 0 \\ -(n_2-n_1)/n_2 r_2 & n_1/n_2 \end{bmatrix} \qquad (5c)$$

$M_3$ is the transformation of the ray parameters in the GRIN lens and is expressed as follows:

$$M_3 = \begin{bmatrix} \cos(gL) & \dfrac{\sin(gL)}{g} \\ -g\sin(gL) & \cos(gL) \end{bmatrix} \qquad (5c)$$

where g is given by equation (3b) for a GRIN lens having length L and refractive index profile given by:

$$n'(r)=n(1-g^2 r^2)^{1/2} \qquad (5d)$$

where r is the radial position from the lens axis. $M_4$ is the transformation of the ray parameters from a medium of index $n_1$ to n at plane (4) and is expressed as follows:

$$M_4 = \begin{bmatrix} 1 & 0 \\ 0 & n_1/n \end{bmatrix} \qquad (5e)$$

The length L and focusing parameter g of the GRIN lens can be adjusted so that the mode field radius $w_4$ at plane (4) is transformed to as close as possible to the mode field radius $w_p$ of the single-mode pigtail fiber after the beam goes through the GRIN lens.

A hyperbolic lens focuses a collimated beam to a diffraction-limited spot but cannot focus a non-collimated beam to a diffraction limited spot because it does not make the path lengths of all the rays equal at a spot. For a GRIN lens having a quarter pitch, the beam at the output face of the GRIN lens is collimated. Hence, if a hyperbolic lens follows a quarter-pitch GRIN lens, the beam from the single-mode pigtail fiber would be focused to a diffraction-limited spot. For a GRIN lens that does not have a quarter pitch, the output beam at the end of the GRIN lens would be diverging or converging, depending on whether the length of the GRIN lens is shorter or longer than quarter pitch. Therefore, the GRIN lens is preferably designed at or close to quarter pitch. It should be noted, however, that there are applications where it would be desirable to have non-quarter pitch GRIN lens. For these applications, the inventors provide a near-hyperbolic lens that can focus a non-collimated beam to a diffraction-limited spot.

Table 1 below indicates the MFD and radius of curvature of the output beam (R) as a function of GRIN lens length (Z). The parameters used in the calculation are as follows: core radius a=50 μm, relative index difference Δ=0.01, operating wavelength λ=1550 nm, and mode field radius of single-mode pigtail fiber $w_p$=10.6 μm.

TABLE 1

| Z(mm) | MFD (μm) | R(mm) |
|---|---|---|
| 0.15 | 9.544436065 | 0.276522 |
| 0.16 | 9.880469672 | 0.302607 |
| 0.17 | 10.19672103 | 0.333614 |
| 0.18 | 10.49111006 | 0.370933 |
| 0.19 | 10.76181305 | 0.416623 |
| 0.2 | 11.00723608 | 0.473827 |
| 0.21 | 11.22599466 | 0.547572 |
| 0.22 | 11.41689802 | 0.646393 |
| 0.23 | 11.57893731 | 0.786001 |
| 0.24 | 11.7112765 | 0.99881 |
| 0.25 | 11.81324573 | 1.364093 |
| 0.26 | 11.88433631 | 2.140502 |
| 0.27 | 11.92419729 | 4.933849 |
| 0.2776 | 11.9334793 | 472.7168 |
| 0.28 | 11.93263319 | −16.3388 |
| 0.29 | 11.90960273 | −3.07433 |
| 0.30 | 11.85521866 | −1.69397 |
| 0.31 | 11.76974837 | −1.16665 |
| 0.32 | 11.65361566 | −0.88767 |
| 0.33 | 11.50740347 | −0.71467 |
| 0.34 | 11.33185804 | −0.59666 |
| 0.35 | 11.12789463 | −0.51087 |
| 0.36 | 10.89660521 | −0.44559 |
| 0.37 | 10.63926875 | −0.39422 |
| 0.38 | 10.3573647 | −0.35272 |
| 0.39 | 10.05259072 | −0.31854 |
| 0.4 | 9.726885718 | −0.28996 |

For the design shown in Table 1, the pitch length of the GRIN is approximately 1110 μm (or 1.11 mm). Using equation (3c), the quarter pitch is approximately 277.6 μm (or 0.2776 mm). For GRIN lens length close to quarter pitch, R is very large. For GRIN lens length below quarter pitch, R is diverging. For example, for GRIN lens length of 260 μm, R is approximately 2.14 mm. For GRIN lens length above quarter pitch, R is converging. For example, for GRIN lens length of 290 μm, R is approximately −3.07 mm. For the GRIN lens lengths where R is converging or diverging, a near-hyperbolic shape, which is a modified hyperbolic shape with a correction factor that compensates for beam curvature, is needed to achieve a focused spot that is diffraction-limited.

Figure 4A:
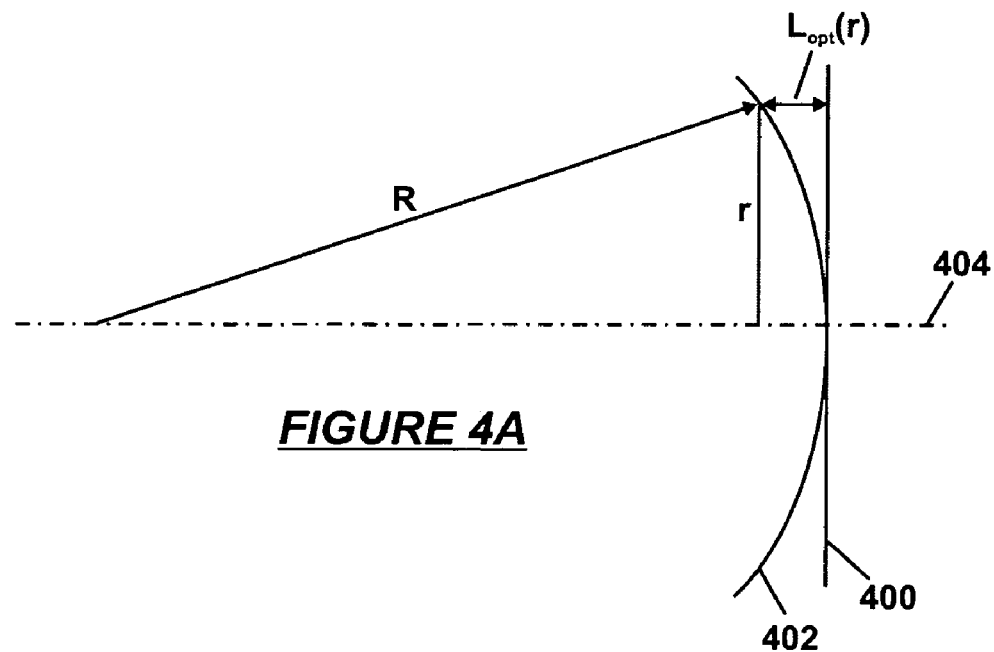
FIG. 4A is a geometrical representation of a planar beam wavefront and a diverging beam wavefront.

A near-hyperbolic lens profile can be determined with reasonable accuracy by calculating the optical and physical path length changes that need to be made to a hyperbolic profile to compensate for beam curvature. FIG. 4A shows a planar beam wavefront 400, which is produced if the GRIN lens length is at or near quarter pitch, and a diverging beam wavefront 402, which is produced if the GRIN lens length is shorter than quarter pitch. Compared to the optical path length of the planar beam wavefront 400, the optical path length of the diverging beam wavefront 402 is reduced away from the optical axis 404. The optical path length difference, $L_{opt}(r)$, as a function of the radial distance from the optical axis 404 can be calculated using the formula:

$$L_{opt}(r) = R(1-\cos\phi) \tag{6a}$$

where $$\phi = \sin^{-1}(r/R) \tag{6b}$$

Figure 4B:
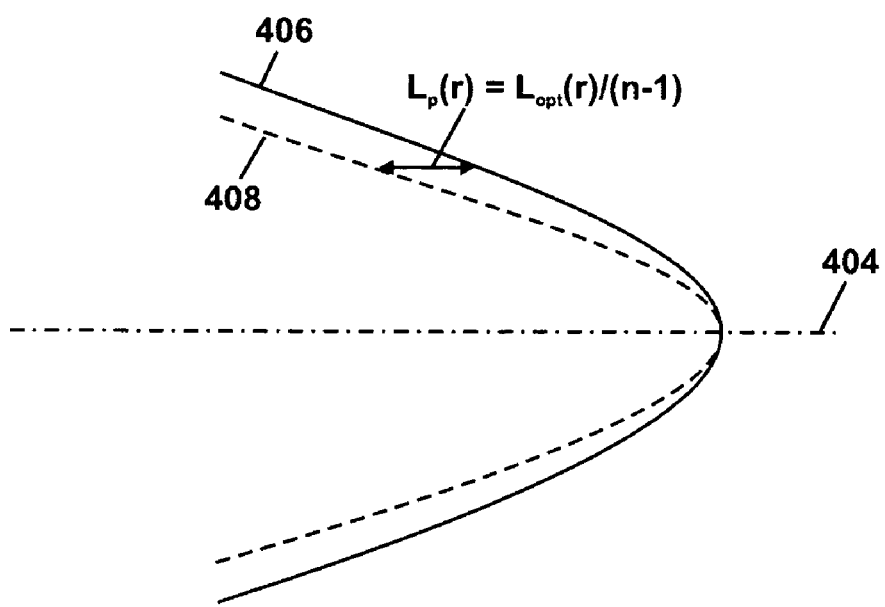
FIG. 4B is a schematic of changes to be made to a hyperbolic shape to form a near-hyperbolic lens.

The physical path length difference, $L_p(r)$, is given by $$L_p(r) = \frac{L_{opt}(r)}{(n-1)} \tag{6c}$$

where n is the index of the lens material. In a similar fashion, the near-hyperbolic shape for GRIN lens lengths longer than quarter pitch, i.e., converging beam wavefront, can be calculated. In this case, the optical path length difference needs to be increased as a function of distance from optical axis. FIG. 4B shows the schematic of the changes made to a hyperbolic shape 406 to achieve a near-hyperbolic shape 408 that can focus a diverging beam wavefront into a diffraction limited spot.

For a specific example of a GRIN lens length of 200 μm with a radius of curvature (R) of 473.8 μm, the optical path length deviation from the hyperbolic shape as a function of the radial position from optical axis is given in Table 2.

TABLE 2

| r (μm) | $L_{opt}$ |
|---|---|
| 2 | 0.004228 |
| 4 | 0.016913 |
| 6 | 0.038054 |
| 8 | 0.067652 |
| 10 | 0.105704 |
| 12 | 0.152212 |
| 14 | 0.207173 |
| 16 | 0.270587 |
| 18 | 0.342453 |
| 20 | 0.42277 |
| 22 | 0.511536 |

The physical path length difference is calculated from the optical path length by dividing it by (n−1), where n is the index of the lens material. As can be seen from Table 2, for large radius of curvature, the modification from the hyperbolic shape is quite small for small distances from the optical axis. However, the deviation becomes larger away from optical axis and for small radii of curvatures. The calculation shown above is meant to show an example of a procedure for determining the near-hyperbolic shape. A more accurate determination of the near-hyperbolic shape can be made using appropriate lens design models.

In accordance with the present invention, the length of each GRIN lens used in a fiber lens may be different than the quarter pitch when necessary. As a result, and in accordance with the present invention, the same blank may be used to draw GRIN lenses for use in various applications. Because the refractive index profile of the blank need not be changed, the blank making process and GRIN lens making process may be simplified. Accordingly, the same blank can be used for different mode-transforming applications. The blank is preferably redrawn to different outside diameters for different applications, and the resulting GRIN lens may be cut or cleaved to different lengths to meet the requirements for different applications. GRIN lens parameters such as GRIN lens quarter pitch may be determined using the procedure previously described. In the present invention, the near-hyperbolic lens removes the restriction that the GRIN lens must be quarter pitch to achieve a diffraction-limited spot. The near-hyperbolic shape effectively combines the function of a hyperbolic lens and a spherical lens that corrects the residual curvature.

Figure 5:
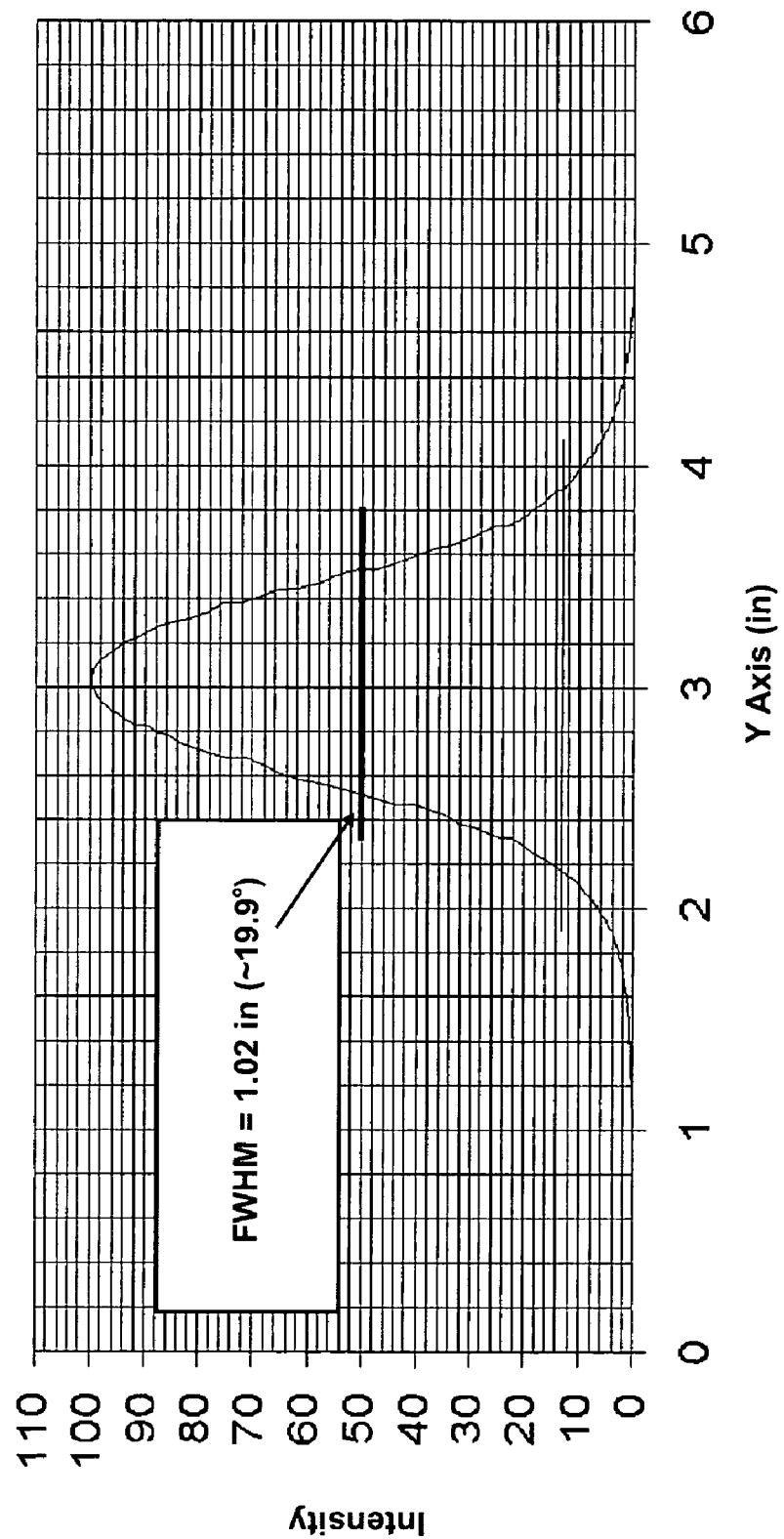
FIG. 5 is a plot of far-field intensity distribution as a function of far-field divergence angle for a fiber lens according to an embodiment of the invention.

In one example, which is not to be construed as limiting the invention as otherwise described herein, a Corning SMF-28® fiber is used as a single-mode pigtail fiber. The pigtail fiber is spliced to one end of a GRIN lens, and a near-hyperbolic lens is formed at the other end of the GRIN lens. The distance between the splice and the tip of the hyperbolic lens is approximately 275 μm. The GRIN lens has a core diameter of 50 μm and an outside diameter of 125 μm. The relative index difference between the core and cladding of the GRIN lens is 1%. FIG. 5 shows a graph of far-field intensity distribution as a function of far-field divergence angle for this example. The characterization is done at 1.31 μm, and far-field full-width half-maximum (FWHM) divergence angle of the fiber lens is approximately 20°. The graph shows that the intensity distribution is quite Gaussian.

One of the applications of the fiber lens of the present invention is in coupling of optical signals between an optical fiber and a semiconductor optical amplifier (SOA) or other waveguide. Typical requirements for these applications include: MFD<3.0 μm, distance to beam waist>10 μm, return loss>45 dB, and a robust lens shape to prevent breakages during component assembly. For SOA and waveguide applications, the fiber lens has to transform the mode field of the pigtail fiber to match that of the waveguide or the SOA. The waveguides and a number of the SOA devices currently under consideration now have MFDs that are substantially round. MFDs for SOAs are in the range of 2.5–3.8 μm at 1550 nm. These values correspond to far-field full-width half-maximum (FWHM) divergence angles as high as 18–22 degrees. Far-field divergence half angle (θ) at ~13.5% ($1/e^2$) intensity level is given by:

$$\theta = \frac{\lambda}{\pi w_0} \tag{7}$$

where λ is the wavelength of the light and $w_0$ is the mode field radius of the beam. MFD is $2w_0$.

Another attribute of the SOAs that has impact on the SOA assembly process and the desirable features of fiber lenses is the angled facet of the SOA. For reduced back reflections, the facets of the SOAs are angled at approximately 15°. With angled facet, it becomes important that the gap between the facet edge and the fiber lens tip be reasonable. Otherwise, as the fiber lens is being aligned to the SOA for optimum coupling, there is a good probability that the fiber lens will come in contact with the SOA facet and damage it. Most of the currently available fiber lenses that have MFDs in the 2.5–3.8 μm range at 1550 nm operating wavelength have working distances as small as 5–10 μm. Hence, it would be advantageous to increase it to greater than 15–20 μm to improve this attribute and reduce the probability of damaging the SOA during assembly process. Also, the SOAs are quite sensitive to back reflections. If the working distance is large, then a smaller fraction of back reflection from the fiber lens tip reaches the SOA. This also improves the performance and stability of the SOA.

Another useful feature for SOA applications is the intensity distribution and wavefront characteristics of the light focused by the fiber lens. The wavefront characteristics should match the mode field intensity distributions between the SOA and the pigtail fiber as closely as possible in both size, intensity distribution and phase. This implies that the focused light from the pigtail fiber through the fiber lens has to have dimension in the 2.5–3.8 µm range and be as Gaussian as possible. Currently available fiber lenses achieve this property at the larger MFDs, but not so well at the smaller MFDs. This leads to higher coupling losses and degrades the SOA performance. It is advantageous to improve this performance.

Another attribute is the robustness of the fiber lens. For example, if the fiber lens design is such that it has a very small and fragile tip, during the various processing steps involved in the preparation of the fiber lens for assembly into a SOA package, there is a probability that the lens tip will get damaged and degrade the performance. A physically robust fiber tip which is not fragile would be a useful attribute. Another useful attribute will be a lens design and process that is stable and has more tolerance to process variations. For example, if the lens tip has a radius of curvature of 10 µm, a very small variation of 1 µm in the radius of curvature would be a 10% variation and can change the focusing characteristics significantly. The same 1 µm variation in a 25 µm radius of curvature design may not degrade the performance to the same extent. In the present invention, some of these issues are addressed and improved.

Another application of the fiber lens of the present invention is in coupling of optical signals between an optical fiber and a laser diode. The laser diodes used for transmission lasers have far-field divergence angles as high as 40°, which corresponds to a MFD of about 0.8 µm at a wavelength of 1550 nm. The aspect ratio of the laser radiation in x- and y-directions varies from 1 to 4. The closer the MFD of the lens is matched to this, the higher the coupling efficiency. In this disclosure, the fiber lenses are generally geared towards devices that have aspect ratios closer to 1. A distance to beam waist greater than 10 µm is desirable, since this will prevent the lens from damaging laser during assembly. The preferred performance characteristics of the fiber lens for this application are as follows: MFD<3.0 µm or divergence angle>22° at 1550-nm operating wavelength, return loss>45 dB, distance to beam waist>10 µm, and lens-to-lens coupling efficiency greater than 90%.

Another application of the fiber lens of the present invention is in coupling of optical signals passed between an optical fiber and a detector. Unlike the above applications where not only the spot size but the intensity distribution and phase front errors matter, the detector applications need the control of the spot size and the amount of power that is within a certain area only. For this application, spot sizes less than 3–5 µm with working distances up to 50–60 µm would be advantageous for low cost assembly.

The fiber lens of the present invention provides one or more advantages. The fiber lens allows coupling of optical signals between optical devices. The hyperbolic lens or near-hyperbolic lens formed at the tip of the fiber lens is mechanically robust and is less likely to get damaged and degrade in performance in comparison to, for example, a tapered lens. The multimode parameters of the GRIN lens and the shape of the hyperbolic or near-hyperbolic lens can be controlled to achieve small MFDs with reasonably Gaussian intensity patterns and long working distances. The hyperbolic lens focuses a collimated beam to a diffraction-limited spot. The near-hyperbolic lens corrects for wavefront curvature in a non-collimated beam, allowing the beam to be focused to a diffraction-limited spot.

While the invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the invention.

What is claimed is:

1. A fiber lens, comprising:
   a graded-index lens;
   a single-mode fiber affixed to a first end of the graded-index lens; and
   a refractive lens having a hyperbolic shape affixed to at a second end of the graded-index lens to focus a beam from the single-mode fiber to a diffraction-limited spot.

2. The fiber lens of claim 1, wherein a relative index difference between a core and cladding of the graded-index lens is in a range from approximately 0.5 to 3%.

3. The fiber lens of claim 1, wherein an operating wavelength of the fiber lens is in a range from 250 to 2,000 nm.

4. A fiber lens, comprising:
   a graded-index lens;
   a single-mode fiber disposed at a first end of the graded-index lens;
   a refractive lens having a hyperbolic or near-hyperbolic shape disposed at a second end of the graded-index lens to focus a collimated or non-collimated beam, respectively, from the single-mode fiber to a diffraction-limited spot; and
   a coreless spacer rod interposed between the refractive lens and the graded-index lens; wherein a mode field diameter of the spot is less than 10 µm.

5. A fiber lens, comprising:
   a graded-index lens;
   a single-mode fiber disposed at a first end of the graded-index lens;
   a refractive lens having a hyperbolic or near-hyperbolic shape disposed at a second end of the graded-index lens to focus a beam from the single-mode fiber to a diffraction-limited spot, the refractive lens having a uniform refractive index; and
   a spacer rod interposed between the graded-index lens and the single-mode fiber; wherein a mode field diameter of spot is less than 10 µm.

6. A fiber lens, comprising:
   a graded-index lens;
   a single-mode fiber disposed at a first end of the graded-index lens; and
   a refractive lens having a hyperbolic shape formed at a second end of the graded-index lens to focus a beam from the single-mode fiber to a diffraction-limited spot;
   wherein a mode field diameter of the spot is less than 10 µm.

7. The fiber lens of claim 6, wherein the mode field diameter of the spot is in a range of approximately 2 to 5 µm.

8. The fiber lens of claim 6, wherein a working distance of the fiber lens is greater than approximately 5 µm.

9. The fiber lens of claim 6, wherein a working distance of the fiber lens is in a range from approximately 20 to 60 µm.

10. The fiber lens of claim 6, wherein a ratio of distance from a tip of the refractive lens to the beam waist to the mode field diameter at the beam waist is greater than approximately 5.

11. The fiber lens of claim 1, wherein a diameter of a core of the graded-index lens is in a range from approximately 50 to 500 µm.

12. The fiber lens of claim 11, wherein an outer diameter of the graded-index lens is in a range from approximately 60 to 1,000 μm.

13. A fiber lens, comprising:
   a single-mode fiber; and
   a lens disposed at an end of the single-mode fiber;
   wherein a mode field at a beam waist of a bean emerging from a tip of the lens is less than 10 μm and a ratio of distance from the tip of the lens to the beam waist to the mode field diameter at the beam waist is greater than 5.

14. The fiber lens of claim 13, wherein the lens comprises a hyperbolic or near-hyperbolic lens disposed at an end of a graded-index lens.

15. The fiber lens of claim 14, wherein a coreless spacer rod is interposed between the hyperbolic or near-hyperbolic lens and the graded-index lens.

16. A fiber lens, comprising:
   a graded-index lens;
   a single-mode fiber disposed at a first end of the graded-index lens; and
   a refractive lens disposed at a second end of the graded-index lens, the refractive lens having a near-hyperbolic shape that focuses a non-collimated beam into a diffraction-limited spot;
   wherein the near-hyperbolic shape is a modified hyperbolic shape with a correction factor that compensates for beam curvature such that the non-collimated beam is focused into the diffraction-limited spot.

* * * * *